United States Patent
Le et al.

(10) Patent No.: US 11,463,386 B2
(45) Date of Patent: Oct. 4, 2022

(54) SYSTEMS AND METHODS FOR GENERATING CONVERSATIONAL RESPONSES USING MACHINE LEARNING MODELS

(71) Applicant: Capital One Services, LLC, McLean, VA (US)

(72) Inventors: Minh Le, McLean, VA (US); Sara Mikulic, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 122 days.

(21) Appl. No.: 17/029,925

(22) Filed: Sep. 23, 2020

(65) Prior Publication Data

US 2022/0094648 A1   Mar. 24, 2022

(51) Int. Cl.
*H04L 51/02* (2022.01)
*G06K 9/62* (2022.01)
*G06N 20/20* (2019.01)

(52) U.S. Cl.
CPC ............ *H04L 51/02* (2013.01); *G06K 9/6215* (2013.01); *G06K 9/6218* (2013.01); *G06N 20/20* (2019.01)

(58) Field of Classification Search
CPC .......... H04L 51/02; G06N 20/20; G06N 3/08; G06N 3/0445; G06N 3/0454; G06K 9/6215; G06K 9/6218
See application file for complete search history.

(56) References Cited

U.S. PATENT DOCUMENTS

| | | | | |
|---|---|---|---|---|
| 10,691,897 | B1* | 6/2020 | Rajagopal | G06F 40/284 |
| 2018/0152524 | A1* | 5/2018 | Allinson | H04L 67/02 |
| 2018/0232658 | A1* | 8/2018 | Acharya | G06Q 30/0201 |
| 2018/0329990 | A1* | 11/2018 | Severn | G06K 9/6215 |
| 2019/0103095 | A1* | 4/2019 | Singaraju | G06N 5/003 |
| 2019/0311036 | A1* | 10/2019 | Shanmugam | H04L 51/02 |
| 2020/0066255 | A1* | 2/2020 | Madan | G10L 15/197 |
| 2020/0074984 | A1* | 3/2020 | Ho | G10L 15/1815 |
| 2020/0082214 | A1* | 3/2020 | Salammagari | G06N 3/006 |
| 2020/0143247 | A1* | 5/2020 | Jonnalagadda | G06F 40/35 |
| 2020/0151253 | A1* | 5/2020 | Wohlwend | G06K 9/6269 |
| 2021/0304003 | A1* | 9/2021 | Johnson | G06N 3/084 |

OTHER PUBLICATIONS (Reference A)—Greg Hartrell,"Predicting Search Queries Based on Personal Routines", Jan. 5, 2018, IP.com Prior Art Database.*

* cited by examiner

*Primary Examiner* — Jonathan A Bui
*Assistant Examiner* — Kidest Mendaye
(74) *Attorney, Agent, or Firm* — Perkins Coie LLP

(57) ABSTRACT

Methods and systems are described for generating dynamic conversational responses using two-tier machine learning models. The dynamic conversational responses may be generated in real time and reflect the likely goals and/or intents of a user. The two-tier machine learning model may include a first tier that determines an intent cluster based on a feature input, and a second tier that determines a specific intent from the cluster.

18 Claims, 5 Drawing Sheets

SYSTEMS AND METHODS FOR GENERATING CONVERSATIONAL RESPONSES USING MACHINE LEARNING MODELS

FIELD OF THE INVENTION

The invention relates to generating dynamic conversational responses using machine learning based on using intent clusters.

BACKGROUND

In recent years, the amount and uses of interactive programs has risen considerably. In tandem with this rise, is the need to have human-like interactions and/or create applications that mimic the tone, cadence, and speech patterns of humans. Additionally, in order to fulfill user-interaction requirements, these applications need to be helpful, and thus respond intelligently by providing relevant responses to user inputs, whether these inputs are received via text, audio, or video input.

SUMMARY

Methods and systems are described herein for generating dynamic conversational responses. Conversational responses include communications between a user and a system that may maintain a conversational tone, cadence, or speech pattern of a human during an interactive exchange between the user and the system. The interactive exchange may include the system responding to one or more user actions (which may include user inactions) and/or predicting responses prior to receiving a user action. In order to maintain the conversational interaction during the exchange, the system may advantageously generate responses that are both timely and pertinent (e.g., in a dynamic fashion). This requires the system to determine both quickly (i.e., in real-time or near real-time) and accurately the intent, goal, or motivation behind a user input. These user input or actions may take various forms including speech commands, textual inputs, responses to system queries, and/or other user actions (e.g., logging into a mobile application of the system). In each case, the system may aggregate both information about the user, the user action, and/or other circumstances related to the user action (e.g., time of day, previous user actions, current account settings, etc.) in order to determine a likely intent of the user.

In order to determine the likely intent and generate a dynamic conversational response that is both timely and pertinent, the methods and systems herein use one or more machine learning models. For example, the methods and systems may include a first machine learning model, wherein the first machine learning model is trained to cluster a plurality of specific intents into a plurality of intent clusters through unsupervised hierarchical clustering. The methods and systems may also use a second machine learning model, wherein the second machine learning model is trained to select a subset of the plurality of intent clusters from the plurality of intent clusters based on a first feature input, and wherein each intent cluster of the plurality of intent clusters corresponds to a respective intent of a user following the first user action.

For example, aggregated information about the user action, information about the user, and/or other circumstances related to the user action (e.g., time of day, previous user actions, current account settings, etc.) may be used to generate a feature input (e.g., a vector of data) that expresses the information quantitatively or qualitatively. However, feature inputs for similar intents (e.g., a first intent of a user to learn his/her maximum credit limit and a second intent of a user to learn a current amount in his/her bank account) may have similar feature inputs as much of the underlying aggregated information may be the same. Moreover, training data for a machine learning model (e.g., known intents and labeled feature inputs) may be sparse. Accordingly, determining a specific intent of a user, with a high level of precision is difficult, even when using a machine learning model.

To overcome these technical challenges, the methods and systems disclosed herein are powered through multiple machine learning models that determine intent clusters. For example, the methods and systems may include a first machine learning model, wherein the first machine learning model is trained to cluster a plurality of specific intents into a plurality of intent clusters through unsupervised hierarchical clustering. As opposed to manually grouping potential intents, the system trains a machine learning model to identify common user queries that correspond to a group of intents). Accordingly, the system may generate intent clusters that provide access to specific intents and may be represented (e.g., in a user interface) by a single option. The methods and systems may also use a second machine learning model, wherein the second machine learning model is trained to select a subset of the plurality of intent clusters from the plurality of intent clusters based on a first feature input, and wherein each intent cluster of the plurality of intent clusters corresponds to a respective intent of a user following the first user action. For example, the system may need to limit the number of options that appear in a given response (e.g., based on a screen size of a user device upon which the user interface is displayed). Accordingly, the second machine learning model may be trained to select a subset of the plurality intent cluster to be displayed.

As opposed to determining a specific intent of a user, which may be difficult due to the sparseness of available information as well as the particularities of an individual user, the system instead attempts to select a group of intent clusters (e.g., each cluster corresponding to a plurality of specific intents). The group of intent clusters may each correspond to an option in a dynamic conversational response. For example, by selecting an option, the user may access further options for individual specific intents within the cluster. Accordingly, the system relies on the user to select the specific intent that is appropriate and instead is trained to select the intent clusters. While counter intuitive, this approach leads to better results as the number of false positive (i.e., suggesting a specific intent of the user that is incorrect is reduced). Moreover, as opposed to training a machine learning model to rank specific intents and then grouping the specific intents based on the ranking, which leads to all likely relevant specific intents being located in a single cluster (i.e., represented by a single option), the methods and systems herein allowed for likely specific intents to be dispersed throughout the displayed options.

In some aspects, the methods and systems are disclosed for generating dynamic conversational responses using intent clusters. For example, the system may receive a first user action during a conversational interaction with a user interface. The system may determine a first feature input based on the first user action in response to receiving the first user action. The system may retrieve a plurality of intent clusters, wherein the plurality of intent clusters is generated by a first machine learning model that is trained to cluster a plurality of specific intents into the plurality of intent clusters through unsupervised hierarchical clustering. The system may input the first feature input into a second machine learning model, wherein the second machine learning model is trained to select a subset of the plurality of intent clusters from the plurality of intent clusters based on the first feature input, and wherein each intent cluster of the plurality of intent clusters corresponds to a respective intent of a user following the first user action. The system may receive an output from the second machine learning model. The system may select, based on the output, a dynamic conversational response from a plurality of dynamic conversational responses that include a respective option for each intent cluster of the subset of the plurality of intent clusters. The system may generate, at the user interface, the dynamic conversational response during the conversational interaction.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
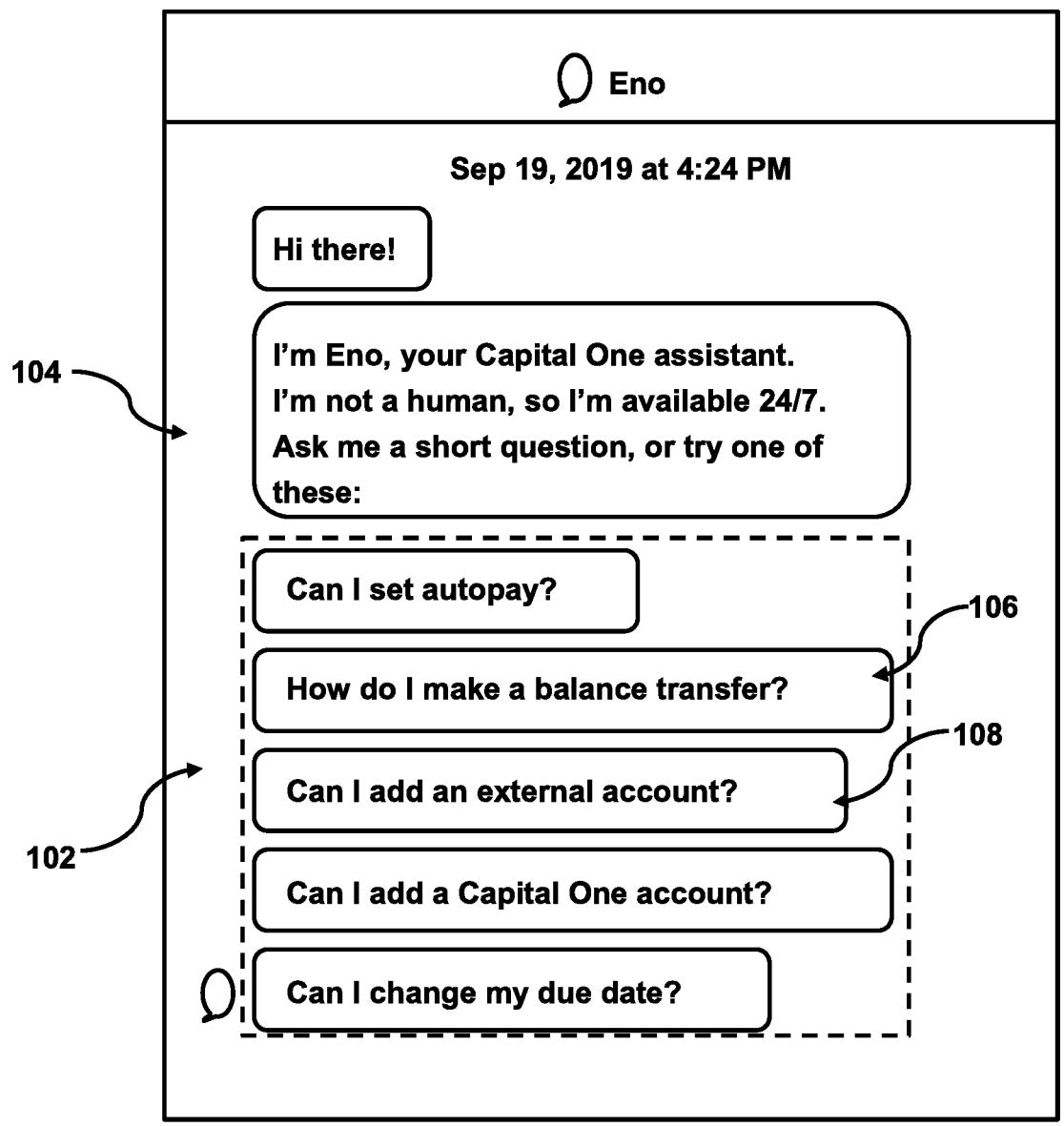
FIG. 1 shows an illustrative user interface for presenting dynamic conversational responses using machine learning models based on intent clusters, in accordance with one or more embodiments.

FIG. 1 shows an illustrative user interface for presenting dynamic conversational responses using machine learning models based on intent clusters, in accordance with one or more embodiments. For example, FIG. 1 shows user interface 100. The system (e.g., a mobile application) may generate and respond to user interactions in a user interface (e.g., user interface 100) in order to engage in a conversational interaction with the user. The conversational interaction may include a back-and-forth exchange of ideas and information between the system and the user. The conversational interaction may proceed through one or more mediums (e.g., text, video, audio, etc.)

In order to maintain the conversational interaction, the system may need to generate response (e.g., conversational response) dynamically and/or in substantially real-time. For example, the system may generate responses within the normal cadence of a conversation. In some embodiments, the system may continually determine a likely intent of the user in order to generate responses (e.g., in the form of prompts, notifications, and/or other communications) to the user. It should be noted that a response may include any step or action (or inaction) taken by the system, including computer processes, which may or may not be perceivable to a user.

For example, in response to a user action, which in some embodiments may comprise a user logging onto an application that generates user interface 100, inputting a query (e.g., query 104) into user interface 100, and/or a prior action (or lack thereof) by a user to a prior response generated by the system, the system may take one or more steps to generate dynamic conversational responses. These steps may include retrieving data about the user, retrieving data from other sources, monitoring user actions, and/or other steps in order to generate a feature input (e.g., as discussed below).

In some embodiments, the feature input may include a vector that describes various information about a user, a user action (which may include user inactions), and/or a current or previous interaction with the user. The system may further select the information for inclusion in the feature input based on a predictive value. The information may be collected actively or passively by the system and compiled into a user profile.

In some embodiments, the information (e.g., a user action) may include conversation details such as information about a current session, including a channel or platform, e.g., desktop web, iOS, mobile, a launch page (e.g., the webpage that the application was launched from), a time of launch, activities in a current or previous session before launching the application. The system may store this information and all the data about a conversational interaction may be available in real-time via HTTP messages and/or through data streaming from one or more sources (e.g., via an API.).

In some embodiments, the information (e.g., a user action) may include user account information such as types of accounts the user has, other accounts on file such as bank accounts for payment, information associated with accounts such as credit limit, current balance, due date, recent payments, recent transactions. The system may obtain this data in real-time for model prediction through enterprise APIs.

In some embodiments, the information (e.g., a user action) may include insights about users, provided to the application (e.g., via an API) from one or more sources such as a qualitative or quantitative representations (e.g., a percent) of a given activity (e.g., online spending) in a given time period (e.g., six months), upcoming actions (e.g., travel departure, pay day, leave and/or family event) for a user, information about third parties (e.g., merchants (ranked by the number of transactions) over the last year for the user), etc.

In some embodiments, to generate the first feature input, the system may use a Bidirectional Encoder BERT language model for performing natural language processing. For example, the BERT model includes pre-training contextual representations including Semi-supervised Sequence Learning, Generative Pre-Training, ELMo, and ULMFit. Unlike previous models, BERT is a deeply bidirectional, unsupervised language representation, pre-trained using only a plain text corpus. Context-free models such as word2vec or GloVe generate a single word embedding representation for each word in the vocabulary, whereas BERT take into account the context for each occurrence of a given word. For instance, whereas the vector for "running" will have the same word2vec vector representation for both of its occurrences in the sentences "He is running a company" and "He is running a marathon", BERT will provide a contextualized embedding that will be different according to the sentence. Accordingly, the system is better able to determine an intent of the user.

In some embodiments, the system may additionally or alternatively, use Embeddings from Language Models ("ELMo"). For example, ELMo is a deep contextualized word representation that models both (1) complex characteristics of word use (e.g., syntax and semantics), and (2) how these uses vary across linguistic contexts (i.e., to model polysemy). These word vectors may be learned functions of the internal states of a deep bidirectional language model (biLM), which may be pre-trained on a large text corpus. ELMOs may be easily added to existing models and significantly improve the state of the art across a broad range of challenging natural language processing problems, including question answering, textual entailment, and sentiment analysis.

In some embodiments, the system may additionally or alternatively, use Universal Language Model Fine-tuning ("ULMFiT"). ULMFiT is a transfer learning technique for use in natural language processing problems, including question answering, textual entailment, and sentiment analysis. ULMFiT may use a Long short-term memory ("LSTM") is an artificial recurrent neural network ("RNN") architecture. The LSTM may include a three layer architecture that includes: general domain language model pre-training; target task language model fine-tuning; and target task classifier fine-tuning.

Response 102 also include options 106 and 108. Options 106 and 108 may correspond to a first and second intent cluster. For example, system 100 may be powered by a plurality of machine learning models (e.g., as described below). System 100 may include a first machine learning model, wherein the first machine learning model is trained to cluster a plurality of specific intents into a plurality of intent clusters. For example, as opposed to determining a specific intent of a user, which may be difficult due to the sparseness of available information as well as the particularities of an individual user, the system instead attempts to select a group of intent clusters (e.g., each cluster corresponding to a plurality of specific intents).

Accordingly, the first machine model may generate intent clusters that efficiently group potential specific intents based on the likelihood that the specific intents in the cluster are related. Thus, if specific intents are related and/or similar, the first machine model may group them into the same or similar intent clusters. Alternatively or additionally, the first machine model may generate intent clusters that efficiently group potential specific intents based on the likelihood that user actions (and/or user profiles) corresponding to a specific intent are related. Thus, if two users perform similar actions, they will receive similar intent clusters.

Options 106 and 108 may provide a link to further options (e.g., in a subsequent dynamic conversational response), which correspond to specific intents with the intent cluster. For example, by selecting option 106 instead of option 108, the user may access further options for individual specific intents within the intent cluster of option 106. Accordingly, the system relies on the user to select the specific intent that is appropriate and thus is trained to select the intent clusters as opposed to specific intents. This approach leads to better results as the number of false positive (i.e., suggesting a specific intent of the user that is incorrect is reduced). Moreover, as opposed to training a machine learning model to rank specific intents and then grouping the specific intents based on the ranking, which leads to all likely relevant specific intents being located in a single cluster (i.e., represented by a single option), the methods and systems herein allowed for likely specific intents to be dispersed throughout the displayed options.

For example, the first machine learning model may quantitatively express each specific intent as a plurality of values (e.g., a vector array). The system may then determine the distance (e.g., the similarities) between two specific intents based on a correlation distance. For example, the first machine learning model may estimate the distance correlation between two vector arrays corresponding to two specific intents. The system may estimate the distance correlation by computing two matrices: the matrix of pairwise distances between observations in a sample from X and the analogous distance matrix for observations from Y. If the elements in these matrices co-vary together, the system may determine that X and Y have a large distance correlation (e.g., the specific intents are similar). If they do not, they have a small distance correlation (e.g., the specific intents are not similar). The distance correlation can be used to create a statistical test of independence between two variables or sets of variables. Specific intent with independence may be put into different intent clusters, whereas specific intents without independence may be put into the same intent cluster.

The system may then use unsupervised hierarchical clustering to build a hierarchy of intent clusters. The system may agglomerative clustering (e.g., a "bottom-up" approach), in which each observation starts in its own cluster, and pairs of clusters are merged as one moves up the hierarchy. Alternatively or additionally, the system may use divisive clustering (e.g., a "top-down" approach) in which all observations start in one cluster, and splits are performed recursively as one moves down the hierarchy.

In some embodiments, system 100 may use the first machine learning model to generate an initial set of a plurality of intent clusters. System 100 may then apply business rules or other factors (e.g., device screen size), to refine the plurality of intent clusters. For example, based on the size of the device, the system may generate intent clusters having a predetermined number (or maximum or minimum number) of specific intents.

System 100 may then select options 106 and 108 based on a second machine learning model predicting that their corresponding intent clusters are relevant to an intent of the user. For example, system 100 may include a second machine learning model, wherein the second machine learning model is trained to select a subset of the plurality of intent clusters from the plurality of intent clusters based on a first feature input, and wherein each intent cluster of the plurality of intent clusters corresponds to a respective intent of a user following the first user action.

For example, the second machine learning model may determine which of the plurality of intent clusters of all available intent clusters should be displayed to the user. This is particularly relevant in devices with small screens as only a few intent clusters (or options related to them) may be displayed. In FIG. 1, the second machine model may select to display option 106 and option 108. Accordingly, system 100 does not need to make predictions on highly correlated specific intents.

Figure 2:
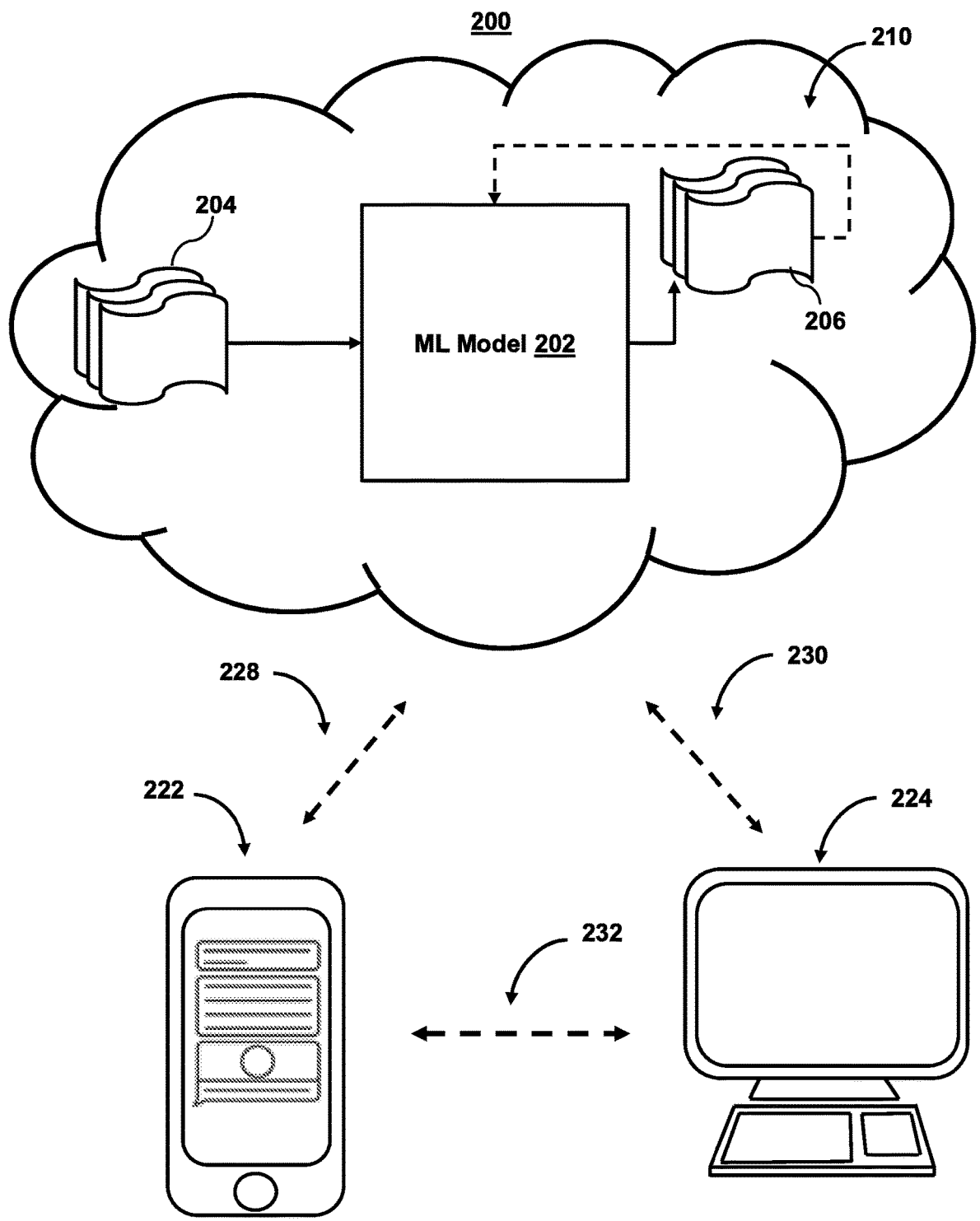
FIG. 2 is an illustrative system for generating dynamic conversational responses using machine learning models based on intent clusters, in accordance with one or more embodiments.

FIG. 2 is an illustrative system for generating dynamic conversational responses using machine learning models based on intent clusters, in accordance with one or more embodiments. For example, system 200 may represent the components used for generating dynamic conversational responses as shown in FIG. 1. As shown in FIG. 2, system 200 may include mobile device 222 and user terminal 224. While shown as a smartphone and personal computer, respectively, in FIG. 2, it should be noted that mobile device 222 and user terminal 224 may be any computing device, including, but not limited to, a laptop computer, a tablet computer, a hand-held computer, other computer equipment (e.g., a server), including "smart," wireless, wearable, and/or mobile devices. FIG. 2 also includes cloud components 210. Cloud components 210 may alternatively be any computing device as described above and may include any type of mobile terminal, fixed terminal, or other device. For example, cloud components 210 may be implemented as a cloud computing system and may feature one or more component devices. It should also be noted that system 200 is not limited to three devices. Users may, for instance, utilize one or more other devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of mobile device 222, those operations may, in some embodiments, be performed by components of cloud components 210. In some embodiments, the various computers and systems described herein may include one or more computing devices that are programmed to perform the described functions. Additionally or alternatively, multiple users may interact with system 200 and/or one or more components of system 200. For example, in one embodiment, a first user and a second user may interact with system 200 using two different components.

With respect to the components of mobile device 222, user terminal 224, and cloud components 210, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 2, both mobile device 222 and user terminal 224 include a display upon which to display data (e.g., based on recommended contact strategies).

Additionally, as mobile device 222 and user terminal 224 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 200 may run an application (or another suitable program). The application may cause the processors and/or control circuitry to perform operations related to generating dynamic conversational responses using two-tier machine learning models.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes communication paths 228, 230, and 232. Communication paths 228, 230, and 232 may include the Internet, a mobile phone network, a mobile voice or data network (e.g., a 4G or LTE network), a cable network, a public switched telephone network, or other types of communications networks or combinations of communications networks. Communication paths 228, 230, and 232 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 210 may be a database configured to store user data for a user. For example, the database may include user data that the system has collected about the user through prior transactions. Alternatively, or additionally, the system may act as a clearing house for multiple sources of information about the user. Cloud components 210 may also include control circuitry configured to perform the various operations needed to generate recommendations. For example, the cloud components 210 may include cloud-based storage circuitry configured to store a first machine learning model and a second machine learning model. Cloud components 210 may also include cloud-based control circuitry configured to determine an intent of the user based on a two-tier machine learning model. Cloud components 210 may also include cloud-based input/output circuitry configured to generate the dynamic conversational response during the conversational interaction.

Cloud components 210 includes machine learning model 202. Machine learning model 202 may take inputs 204 and provide outputs 206. The inputs may include multiple datasets such as a training dataset and a test dataset. Each of the plurality of datasets (e.g., inputs 204) may include data subsets related to user data, contact strategies, and results. In some embodiments, outputs 206 may be fed back to machine learning model 202 as input to train machine learning model 202 (e.g., alone or in conjunction with user indications of the accuracy of outputs 206, labels associated with the inputs, or with other reference feedback information). In another embodiment, machine learning model 202 may update its configurations (e.g., weights, biases, or other parameters) based on the assessment of its prediction (e.g., outputs 206) and reference feedback information (e.g., user indication of accuracy, reference labels, or other information). In another embodiment, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

In some embodiments, machine learning model 202 may include an artificial neural network (e.g., as described in FIG. 3 below). In such embodiments, machine learning model 202 may include an input layer and one or more hidden layers. Each neural unit of machine learning model 202 may be connected with many other neural units of machine learning model 202. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 202 may be self-learning and trained, rather than explicitly programmed, and can perform significantly better in certain areas of problem solving, as compared to traditional computer programs. During training, an output layer of machine learning model 202 may correspond to a classification of machine learning model 202 and an input known to correspond to that classification may be input into an input layer of machine learning model 202 during training. During testing, an input without a known classification may be input into the input layer, and a determined classification may be output.

In some embodiments, machine learning model 202 may include multiple layers (e.g., where a signal path traverses from front layers to back layers). In some embodiments, back propagation techniques may be utilized by machine learning model 202 where forward stimulation is used to reset weights on the "front" neural units. In some embodiments, stimulation and inhibition for machine learning model 202 may be more free-flowing, with connections interacting in a more chaotic and complex fashion. During testing, an output layer of machine learning model 202 may indicate whether or not a given input corresponds to a classification of machine learning model 202.

Figure 3:
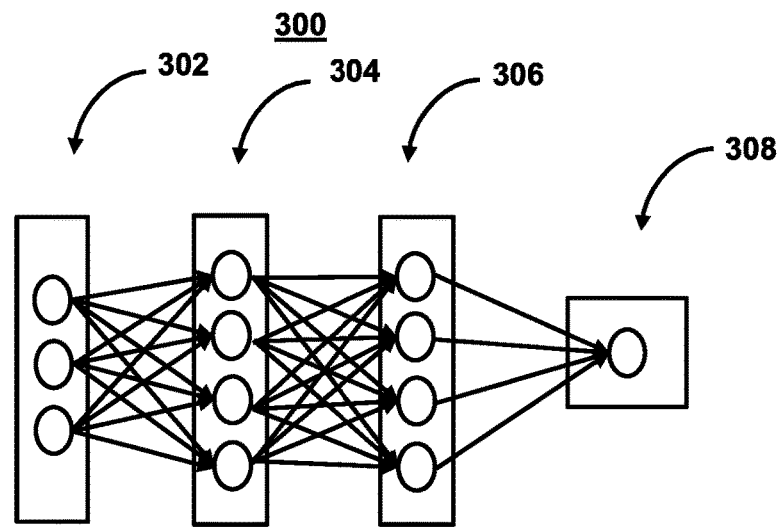
FIG. 3 is an illustrative model architecture for machine learning models based on intent clusters, in accordance with one or more embodiments.
Figure 3:
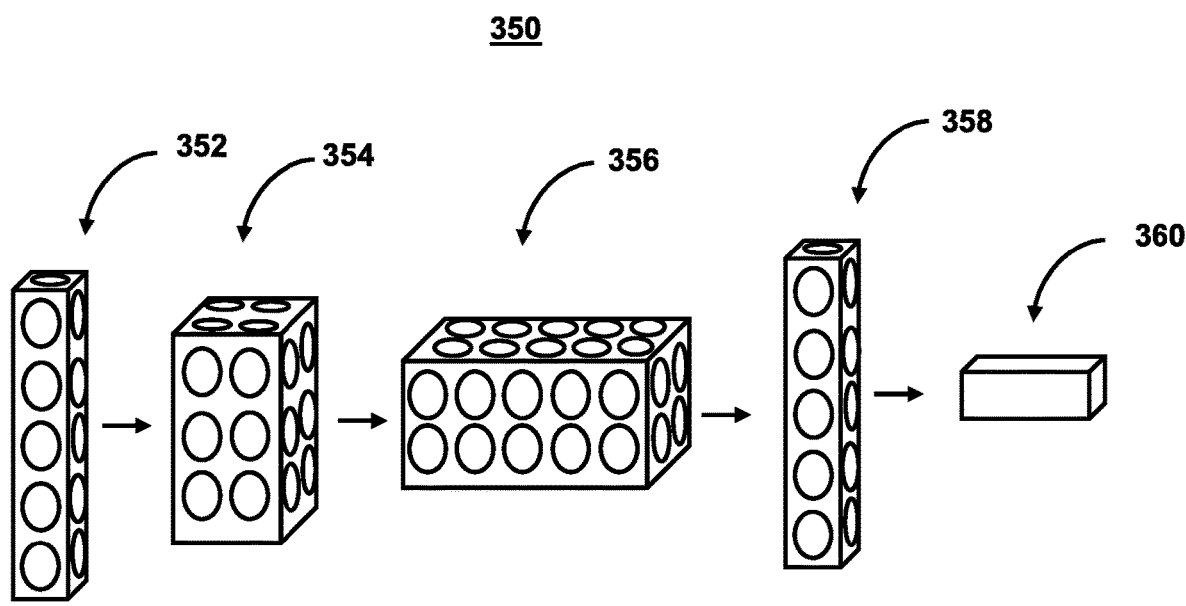

FIG. 3 shows graphical representations of artificial neural network models for generating recommendations for causes of computer alerts that are automatically detected by a machine learning algorithm, in accordance with one or more embodiments. Model 300 illustrates an artificial neural network. Model 300 includes input layer 302. Model 300 also includes one or more hidden layers (e.g., hidden layer 304 and hidden layer 306). Model 300 may be based on a large collection of neural units (or artificial neurons). Model 300 loosely mimics the manner in which a biological brain works (e.g., via large clusters of biological neurons connected by axons). Each neural unit of a model 300 may be connected with many other neural units of model 300. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Model 300 may be self-learning and trained, rather than explicitly programmed, and can perform significantly better in certain areas of problem solving, as compared to traditional computer programs. During training, output layer 308 may corresponds to a classification of model 300 (e.g., whether or not an alert status corresponds to a given value corresponding to the plurality of computer states) and an input known to correspond to that classification may be input into input layer 302. In some embodiments, model 300 may include multiple layers (e.g., where a signal path traverses from front layers to back layers). In some embodiments, back propagation techniques may be utilized by model 300 where forward stimulation is used to reset weights on the "front" neural units. In some embodiments, stimulation and inhibition for model 300 may be more free-flowing, with connections interacting in a more chaotic and complex fashion. Model 300 also includes output layer 308. During testing, output layer 308 may indicate whether or not a given input corresponds to a classification of model 300 (e.g., whether or not an alert status corresponds to a given values corresponding to the plurality of computer states).

FIG. 3 also includes model 350, which is a convolutional neural network. The convolutional neural network is an artificial neural network that features one or more convolutional layers. As shown in model 350, input layer 352 may proceed to convolution blocks 354 and 356 before being output to convolutional block 358. In some embodiments, model 350 may itself serve as an input to model 300. Model 350 may generate output 360, which may include data used to generate a recommendation (e.g., recommendation 102) (FIG. 1)).

In some embodiments, model 350 may implement an inverted residual structure where the input and output of a residual block (e.g., block 354) are thin bottleneck layers. A residual layer may feed into the next layer and directly into layers that are one or more layers downstream. A bottleneck layer (e.g., block 358) is a layer that contains few neural units compared to the previous layers. Model 350 may use a bottleneck layer to obtain a representation of the input with reduced dimensionality. An example of this is the use of autoencoders with bottleneck layers for nonlinear dimensionality reduction. Additionally, model 350 may remove non-linearities in a narrow layer (e.g., block 358) in order to maintain representational power. In some embodiments, the design of model 350 may also be guided by the metric of computation complexity (e.g., the number of floating point operations). In some embodiments, model 350 may increase the feature map dimension at all units to involve as many locations as possible instead of sharply increasing the feature map dimensions at neural units that perform downsampling. In some embodiments, model 350 may decrease the depth and increase width of residual layers in the downstream direction.

Figure 4:
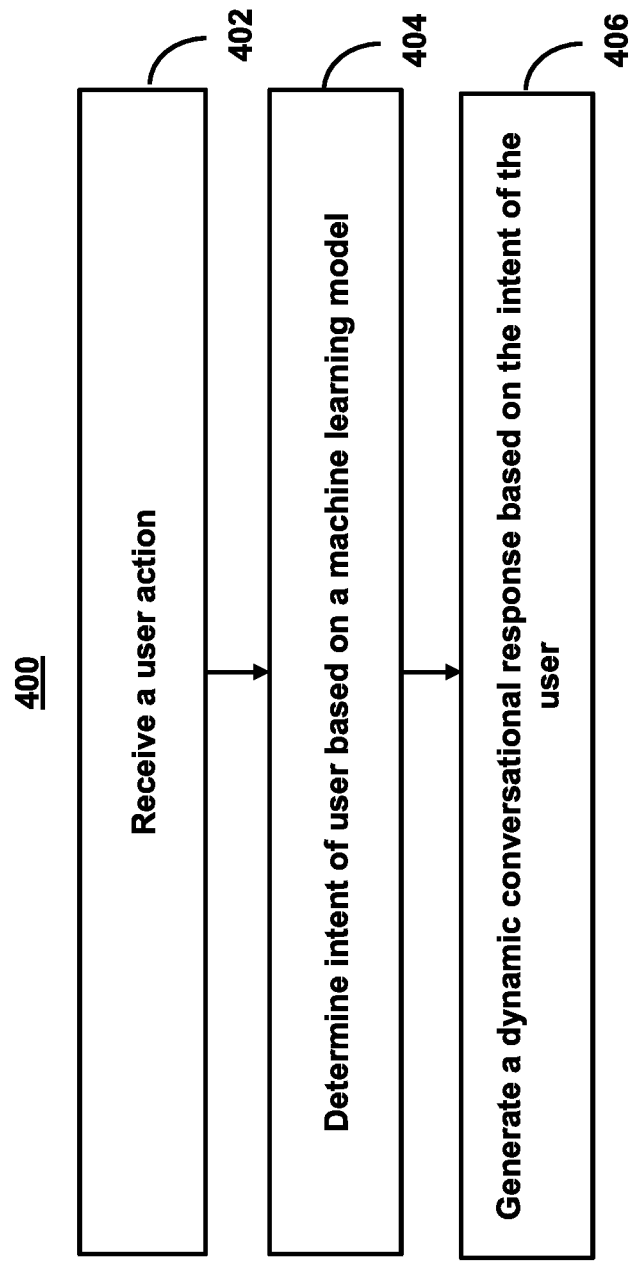
FIG. 4 shows a flowchart of the steps involved in generating dynamic conversational responses using machine learning models based on intent clusters, in accordance with one or more embodiments.

FIG. 4 shows a flowchart of the steps involved in generating dynamic conversational responses using machine learning models based on intent clusters, in accordance with one or more embodiments. For example, process 400 may represent the steps taken by one or more devices as shown in FIGS. 1-2 when generating dynamic conversational responses using machine learning models based on intent clusters (e.g., as shown in FIG. 3).

At step 402, process 400 (e.g., using one or more components in system 200 (FIG. 2)) receives a user action. For example, the system may receive one or more user inputs to a user interface (e.g., user interface 100 (FIG. 1)). The system may then determine a likely intent of the user in order to generate one or more dynamic conversational responses based on that intent. The user action may take various forms include speech commands, textual inputs, responses to system queries, and/or other user actions (e.g., logging into a mobile application of the system). In each case, the system may aggregate information about the user action, information about the user, and/or other circumstances related to the user action (e.g., time of day, previous user actions, current account settings, etc.) in order to determine a likely intent of the user.

At step 404, process 400 (e.g., using one or more components in system 200 (FIG. 2)) determines an intent of a user using machine learning models based on intent clusters. For example, the methods and systems may include a first machine learning model, wherein the first machine learning model is trained to cluster a plurality of specific intents into a plurality of intent clusters through unsupervised hierarchical clustering. For example, as opposed to manually grouping potential intents, the system trains a machine learning model to identify common user queries that correspond to a group of intents). Accordingly, the system may generate intent clusters that provide access to specific intents and may be represented (e.g., in a user interface) by a single option. The methods and systems may also use a second machine learning model, wherein the second machine learning model is trained to select a subset of the plurality of intent clusters from the plurality of intent clusters based on a first feature input, and wherein each intent cluster of the plurality of intent clusters corresponds to a respective intent of a user following the first user action. For example, the system may need to limit the number of options that appear in a given response (e.g., based on a screen size of a user device upon which the user interface is displayed).

At step 406, process 400 (e.g., using one or more components in system 200 (FIG. 2)) generates a dynamic conversational response based on the intent of the user. For example, by using machine learning models based on intent clusters, the system may ensure that at least a conversational response is generated based on an intent in the correct cluster. The system may also increase the likelihood that intent cluster provides a correct specific intent of the user as the system determines only a subset of options and the user selects the option matching his/her intent. For example, the system may generate a dynamic conversational response (e.g., response 102 (FIG. 1)) and present the response in a user interface (e.g., user interface 100 (FIG. 1)). The response may appear with one or more likely responses (e.g., as shown in FIG. 1)). In some embodiments, the system may receive a user action selecting (or not selecting) a response (e.g., response 102 (FIG. 1)) from a user interface.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-2 could be used to perform one of more of the steps in FIG. 4.

Figure 5:
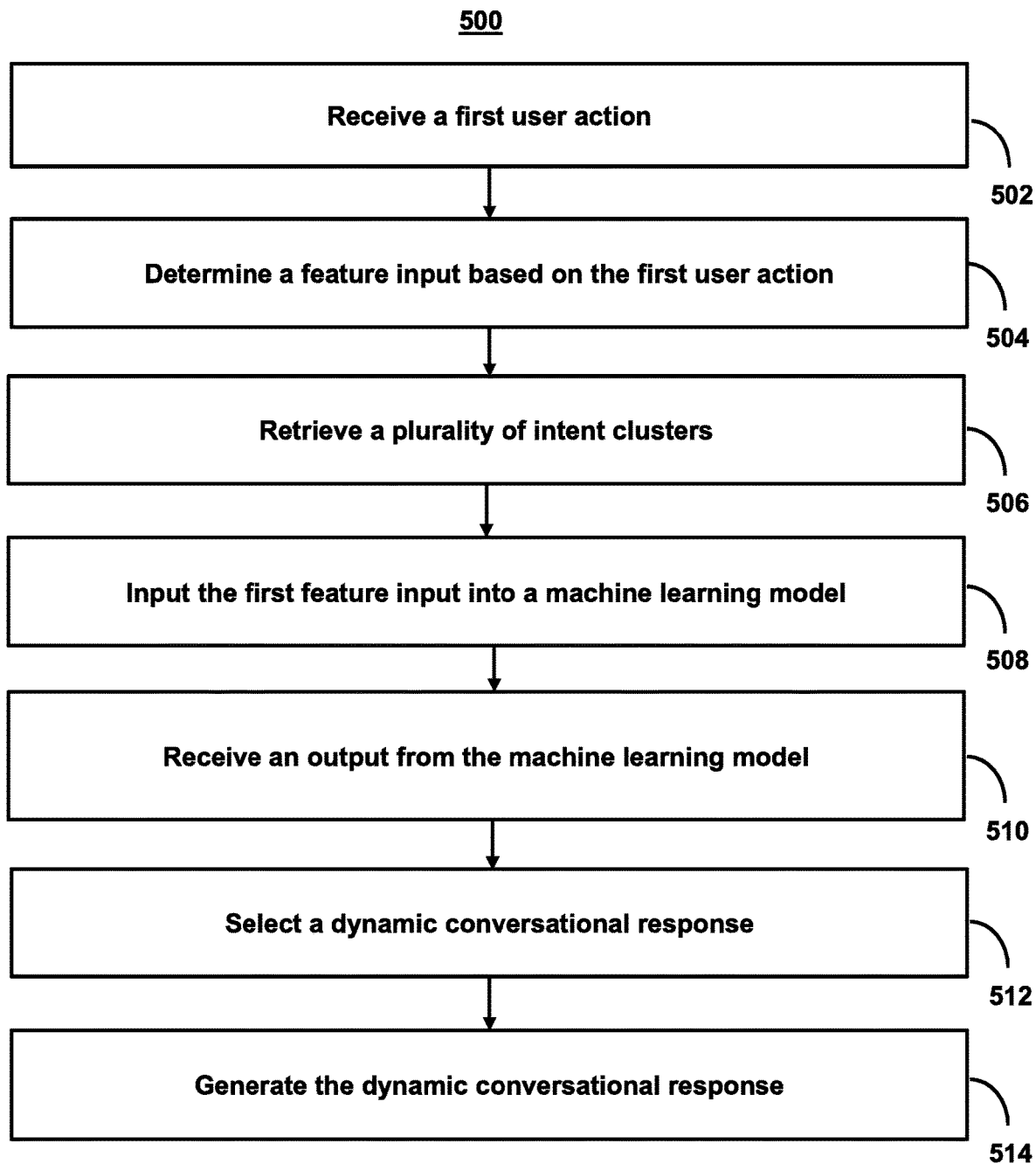
FIG. 5 shows a flowchart of the steps involved in generating dynamic conversational responses using machine learning models based on intent clusters, in accordance with one or more embodiments.

FIG. 5 shows a flowchart of the steps involved in generating dynamic conversational responses using machine learning models based on intent clusters, in accordance with one or more embodiments. For example, process 500 may represent the steps taken by one or more devices as shown in FIGS. 1-3 when in generating dynamic conversational responses.

At step 502, process 500 (e.g., using one or more components in system 200 (FIG. 2)) receives a user action. For example, the system may receive a first user action during a conversational interaction with a user interface.

At step 504, process 500 (e.g., using one or more components in system 200 (FIG. 2)) determines a feature input based on the first user action. For example, the system may determine a first feature input based on the first user action in response to receiving the first user action. In some embodiments, the first feature input may be a conversational detail or information from a user account of the user. In some embodiments, the first feature input may be a time at which the user interface was launched. In some embodiments, the first feature input may be a webpage from which the user interface was launched. For example, the first feature input may indicate a webpage, application interface, user device, user account, communication channel, platform (e.g., iOS, Android, Desktop Web, mobile Web), and/or user profile from which the user interface was launched.

At step 506, process 500 (e.g., using one or more components in system 200 (FIG. 2)) retrieves a plurality of intent clusters. For example, the system may retrieve a plurality of intent clusters, wherein the plurality of intent clusters is generated by a first machine learning model that is trained to cluster a plurality of specific intents into the plurality of intent clusters through unsupervised hierarchical clustering. For example, in some embodiments, the first machine learning model is trained to cluster the plurality of specific intents into the plurality of intent clusters through unsupervised hierarchical clustering into hierarchies of correlation-distances between specific intents. For example, the system may generate a matrix of pairwise correlations corresponding to the plurality of specific intents and cluster the plurality of specific intents based on pairwise distances.

For example, in some embodiments, the system may receive a first labeled feature input, wherein the first labeled feature input is labeled with a known intent cluster for the first labeled feature input and train the second machine learning model to classify the first labeled feature input with the known intent cluster.

At step 508, process 500 (e.g., using one or more components in system 200 (FIG. 2)) inputs the first feature input into a machine learning model. For example, the system may input the first feature input into a second machine learning model, wherein the second machine learning model is trained to select a subset of the plurality of intent clusters from the plurality of intent clusters based on the first feature input, and wherein each intent cluster of the plurality of intent clusters corresponds to a respective intent of a user following the first user action. In some embodiments, the system may select the second machine learning model, from a plurality of machine learning models, based on the plurality of intent clusters that are retrieved. For example, the system may select different second machine learning model based on the number and/or configuration of the intent clusters. For example, the system may determine that some machine learning models may be better suited for selecting a subset of the intent clusters.

In some embodiments, the system may select the subset of the plurality of intent clusters is further selected based on a screen size of a device generating the user interface. For example, the system may determine based on the size, model, device type, and/or format, a number, length, or size of a dynamic conversational response and/or option in a dynamic conversational response.

At step 510, process 500 (e.g., using one or more components in system 200 (FIG. 2)) receives an output from the machine learning model. For example, the system may receive an output from the second machine learning model.

At step 512, process 500 (e.g., using one or more components in system 200 (FIG. 2)) selects a dynamic conversational response. For example, the system may select, based on the output, a dynamic conversational response from a plurality of dynamic conversational responses that include a respective option for each intent cluster of the subset of the plurality of intent clusters. At step 514, process 500 (e.g., using one or more components in system 200 (FIG. 2)) generates the dynamic conversational response. For example, the system may generate, at the user interface, the dynamic conversational response during the conversational interaction.

In some embodiments, the system may receive a second user action during the conversational interaction with the user interface. In response to receiving the second user action, the system may determine a second feature input for the second machine learning model based on the second user action. The system may input the second feature input into the second machine learning model. The system may receive a different output from the second machine learning model. The system may select, based on the different output, a different dynamic conversational response from the plurality of dynamic conversational responses that corresponds to a different subset of the plurality of intent clusters.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-2 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating dynamic conversational responses using machine learning models using intent clusters, the method comprising: receiving a first user action during a conversational interaction with a user interface; in response to receiving the first user action, determining, using control circuitry, a first feature input based on the first user action; retrieving a plurality of intent clusters, wherein the plurality of intent clusters is generated by a first machine learning model that is trained to cluster a plurality of specific intents into the plurality of intent clusters through unsupervised hierarchical clustering; inputting, using the control circuitry, the first feature input into a second machine learning model, wherein the second machine learning model is trained to select a subset of the plurality of intent clusters from the plurality of intent clusters based on the first feature input, and wherein each intent cluster of the plurality of intent clusters corresponds to a respective intent of a user following the first user action; receiving, using the control circuitry, an output from the second machine learning model; selecting, based on the output, using the control circuitry, a dynamic conversational response from a plurality of dynamic conversational responses that include a respective option for each intent cluster of the subset of the plurality of intent clusters; and generating, at the user interface, the dynamic conversational response during the conversational interaction.

2. The method of embodiment 1, further comprising selecting the second machine learning model, from a plurality of machine learning models, based on the plurality of intent clusters that are retrieved.

3. The method of any one of embodiments 1-2, further comprising: receiving a second user action during the conversational interaction with the user interface; in response to receiving the second user action, determining a second feature input for the second machine learning model based on the second user action; inputting the second feature input into the second machine learning model; receiving a different output from the second machine learning model; and selecting, based on the different output, a different dynamic conversational response from the plurality of dynamic conversational responses that corresponds to a different subset of the plurality of intent clusters.

4. The method of any one of embodiments 1-3, wherein the subset of the plurality of intent clusters is further selected based on a screen size of a device generating the user interface.

5. The method of any one of embodiments 1-4, wherein the first machine learning model is trained to cluster the plurality of specific intents into the plurality of intent clusters through unsupervised hierarchical clustering into hierarchies of correlation-distances between specific intents.

6. The method of any one of embodiments 1-5, wherein training the first machine learning model comprises: generating a matrix of pairwise correlations corresponding to the plurality of specific intents; and clustering the plurality of specific intents based on pairwise distances.

7. The method of any one of embodiments 1-6, further comprising: receiving a first labeled feature input, wherein the first labeled feature input is labeled with a known intent cluster for the first labeled feature input; and training the second machine learning model to classify the first labeled feature input with the known intent cluster.

8. The method of any one of embodiments 1-7, wherein the first feature input is a conversational detail or information from a user account of the user.

9. The method of any one of embodiments 1-8, wherein the first feature input indicates a time at which the user interface was launched.

10. The method of any one of embodiments 1-9, wherein the first feature input indicates a platform from which the user interface was launched.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for generating dynamic conversational responses using machine learning models using intent clusters, the system comprising:
cloud-based storage circuitry configured to:
store a first machine learning model, wherein the first machine learning model is trained to cluster a plurality of specific intents into a plurality of intent clusters through unsupervised hierarchical clustering; and
store a second machine learning model, wherein the second machine learning model is trained to select a subset of the plurality of intent clusters from the plurality of intent clusters based on a first feature input, and wherein each intent cluster of the plurality of intent clusters corresponds to a respective intent of a user following the first user action;
cloud-based control circuitry configured to:
receive the first user action during a conversational interaction with a user interface;
determine the first feature input based on the first user action in response to receiving the first user action;
retrieve the plurality of intent clusters, wherein the plurality of intent clusters is generated by the first machine learning model;
input the first feature input into the second machine learning model;
receive an output from the second machine learning model;
select, based on the output, a dynamic conversational response from a plurality of dynamic conversational responses that include a respective option for each intent cluster of the subset of the plurality of intent clusters;
receive a second user action during the conversational interaction with the user interface;
in response to receiving the second user action, determine a second feature input for the second machine learning model based on the second user action;
input the second feature input into the second machine learning model;
receive a different output from the second machine learning model; and
select, based on the different output, a different dynamic conversational response from the plurality of dynamic conversational responses that corresponds to a different subset of the plurality of intent clusters; and
cloud-based input/output circuitry configured to generate the dynamic conversational response and the different dynamic conversational response during the conversational interaction.

2. A method for generating dynamic conversational responses using machine learning models using intent clusters, the method comprising:
receiving a first user action during a conversational interaction with a user interface;
in response to receiving the first user action, determining, using control circuitry, a first feature input based on the first user action;
retrieving a plurality of intent clusters, wherein the plurality of intent clusters is generated by a first machine learning model that is trained to cluster a plurality of specific intents into the plurality of intent clusters through unsupervised hierarchical clustering;
inputting, using the control circuitry, the first feature input into a second machine learning model, wherein the second machine learning model is trained to select a subset of the plurality of intent clusters from the plurality of intent clusters based on the first feature input, and wherein each intent cluster of the plurality of intent clusters corresponds to a respective intent of a user following the first user action;
receiving, using the control circuitry, an output from the second machine learning model;
selecting, based on the output, using the control circuitry, a dynamic conversational response from a plurality of dynamic conversational responses that include a respective option for each intent cluster of the subset of the plurality of intent clusters;
generating, at the user interface, the dynamic conversational response during the conversational interaction;
receiving a second user action during the conversational interaction with the user interface;
in response to receiving the second user action, determining a second feature input for the second machine learning model based on the second user action;
inputting the second feature input into the second machine learning model;
receiving a different output from the second machine learning model;
selecting, based on the different output, a different dynamic conversational response from the plurality of dynamic conversational responses that corresponds to a different subset of the plurality of intent clusters; and
generating, at the user interface, the different dynamic conversational response during the conversational interaction.

3. The method of claim 2, further comprising selecting the second machine learning model, from a plurality of machine learning models, based on the plurality of intent clusters that are retrieved.

4. The method of claim 2, wherein the subset of the plurality of intent clusters is further selected based on a screen size of a device generating the user interface.

5. The method of claim 2, wherein the first machine learning model is trained to cluster the plurality of specific intents into the plurality of intent clusters through unsupervised hierarchical clustering into hierarchies of correlation-distances between specific intents.

6. The method of claim 2, wherein training the first machine learning model comprises: generating a matrix of pairwise correlations corresponding to the plurality of specific intents; and clustering the plurality of specific intents based on pairwise distances.

7. The method of claim 2, further comprising:
receiving a first labeled feature input, wherein the first labeled feature input is labeled with a known intent cluster for the first labeled feature input; and
training the second machine learning model to classify the first labeled feature input with the known intent cluster.

8. The method of claim 2, wherein the first feature input is a conversational detail or information from a user account of the user.

9. The method of claim 2, wherein the first feature input indicates a time at which the user interface was launched.

10. The method of claim 2, wherein the first feature input indicates a platform from which the user interface was launched.

11. A non-transitory computer-readable media for generating dynamic conversational responses using machine learning models using intent clusters, comprising of instructions that, when executed by one or more processors, cause operations comprising:
receiving a first user action during a conversational interaction with a user interface;
determining a first feature input based on the first user action in response to receiving the first user action;
retrieving a plurality of intent clusters, wherein the plurality of intent clusters is generated by a first machine learning model that is trained to cluster a plurality of specific intents into the plurality of intent clusters through unsupervised hierarchical clustering;
inputting the first feature input into a second machine learning model, wherein the second machine learning model is trained to select a subset of the plurality of intent clusters from the plurality of intent clusters based on the first feature input, and wherein each intent cluster of the plurality of intent clusters corresponds to a respective intent of a user following the first user action;
receiving an output from the second machine learning model;
selecting, based on the output, a dynamic conversational response from a plurality of dynamic conversational responses that include a respective option for each intent cluster of the subset of the plurality of intent clusters;
generating, at the user interface, the dynamic conversational response during the conversational interaction;
receiving a second user action during the conversational interaction with the user interface;
in response to receiving the second user action, determining a second feature input for the second machine learning model based on the second user action;
inputting the second feature input into the second machine learning model;
receiving a different output from the second machine learning model;
selecting, based on the different output, a different dynamic conversational response from the plurality of dynamic conversational responses that corresponds to a different subset of the plurality of intent clusters; and
generating, at the user interface, the different dynamic conversational response during the conversational interaction.

12. The non-transitory computer-readable media of claim 11, further comprising instructions that cause further operations comprising selecting the second machine learning model, from a plurality of machine learning models, based on the plurality of intent clusters that are retrieved.

13. The non-transitory computer-readable media of claim 11, wherein the subset of the plurality of intent clusters is further selected based on a screen size of a device generating the user interface.

14. The non-transitory computer-readable media of claim 11, wherein the first machine learning model is trained to cluster the plurality of specific intents into the plurality of intent clusters through unsupervised hierarchical clustering into hierarchies of correlation-distances between specific intents.

15. The non-transitory computer-readable media of claim 11, wherein training the first machine learning model comprises:
generating a matrix of pairwise correlations corresponding to the plurality of specific intents; and
clustering the plurality of specific intents based on pairwise distances.

16. The non-transitory computer-readable media of claim 11, further comprising:
receiving a first labeled feature input, wherein the first labeled feature input is labeled with a known intent cluster for the first labeled feature input; and
training the second machine learning model to classify the first labeled feature input with the known intent cluster.

17. The non-transitory computer-readable media of claim 11, wherein the first feature input is a conversational detail or information from a user account of the user.

18. The non-transitory computer-readable media of claim 11, wherein the first feature input indicates a time at which the user interface was launched or a webpage from which the user interface was launched.

* * * * *